(12) United States Patent
St. Pierre

(10) Patent No.: US 6,941,895 B2
(45) Date of Patent: Sep. 13, 2005

(54) TREAT DISPENSING CHEWING TOY

(76) Inventor: Tracy Marie St. Pierre, 138 Pleasant St., Wakefield, MA (US) 01880

( * ) Notice: Subject to any disclaimer, the term of this patent is extended or adjusted under 35 U.S.C. 154(b) by 0 days.

(21) Appl. No.: 10/711,887

(22) Filed: Oct. 12, 2004

(65) Prior Publication Data

US 2005/0120973 A1 Jun. 9, 2005

Related U.S. Application Data

(60) Provisional application No. 60/520,884, filed on Nov. 18, 2003.

(51) Int. Cl.$^7$ .......................... A01K 29/00; A01K 5/00
(52) U.S. Cl. .................................... 119/711; 119/51.01
(58) Field of Search ....................... 119/702, 707–711, 119/421, 51.01, 52.1, 52.2, 52.3, 57.8, 57.9, 119/72; D30/160

(56) References Cited

U.S. PATENT DOCUMENTS

| | | | | |
|---|---|---|---|---|
| 1,006,182 | A | * | 10/1911 | Cousin ........................ 119/711 |
| 5,387,165 | A | * | 2/1995 | Warren ........................ 482/35 |
| 5,406,908 | A | * | 4/1995 | Burleigh ..................... 119/57.8 |
| 5,553,570 | A | | 9/1996 | VanNutter, III et al. .... 119/709 |
| 5,664,524 | A | * | 9/1997 | Piglia et al. ................. 119/452 |
| 5,671,696 | A | * | 9/1997 | Liethen ...................... 119/57.8 |
| 5,819,690 | A | * | 10/1998 | Brown ........................ 119/707 |
| 5,965,182 | A | | 10/1999 | Lindgren .................... 426/104 |
| 6,073,588 | A | * | 6/2000 | McClung et al. ........... 119/709 |
| 6,129,053 | A | * | 10/2000 | Markham et al. ........... 119/710 |
| 6,237,538 | B1 | | 5/2001 | Tsengas ...................... 119/707 |
| 6,360,693 | B1 | | 3/2002 | Long, III .................... 119/707 |
| 6,470,830 | B2 | * | 10/2002 | Mann ......................... 119/709 |
| 6,623,328 | B1 | | 9/2003 | Theel ......................... 446/369 |
| 6,688,258 | B1 | | 2/2004 | Kolesar ...................... 119/710 |

FOREIGN PATENT DOCUMENTS

JP 018279176 * 5/1998 ............ A01K 29/00

* cited by examiner

*Primary Examiner*—Son T. Nguyen
(74) *Attorney, Agent, or Firm*—Richard D. Fuerle

(57) ABSTRACT

A module for dispensing treats to a chewing animal has a hollow treat holder that has at least one aperture through which a treat can be inserted by a person or removed by a chewing animal and at least one end that can be removably attached to an end of another of said modules. The treat holder preferably has two ends, a male end and a female end, where the said male end locks into the female end and there is a treat barrier recessed into the ends. The hollow treat holder may have a variety of shapes such as straight, triangular, U-shaped, spheroidal, cubic, and L-shaped. A single module can be used as a treat-dispensing toy or a number of modules can be assembled together to form a larger treat-dispensing toy.

20 Claims, 4 Drawing Sheets

TREAT DISPENSING CHEWING TOY

CROSS-REFERENCE TO RELATED APPLICATION

This application claims priority from provisional application No. 60/520,884, filed Nov. 18, 2003.

BACKGROUND OF THE INVENTION

This invention relates to a treat-dispensing module that can be removably attached to other modules and will gradually dispense treats to a chewing animal. In particular, it relates to a module that has an elastomeric hollow treat holder in which treats can be placed, where the treat holder has a male end and a female end that attach to the female end or the male end of other modules, respectively.

To order to keep dogs and other chewing animals active and entertained, while also stimulating their intellect, they may be provided with toys, of which there are three principal types. Soft, stuffed toys may be made of materials such as rope, fleece, or other soft materials that dogs can rip apart. These toys typically occupy a dog's attention for only about 10 minutes before it loses interest. A dog might play with the remaining pieces intermittently for a few days by tossing them around or ripping them apart further, but after the initial encounter, these type of toys seldom engage a dog for longer than 10 minutes at a time. They also make a considerably mess for owners to clean up.

The second type of toy is the edible toy, such as treats or bones. Treats do not last long and are usually consumed in a few minutes. Some dogs can eat only specially made treats that are allergen-free or dietetic, which are difficult to find. Durable bones, such as rawhide, can initially engage a dog 20 minutes or longer, and a dog will chew the same rawhide bone from time to time over the course of a few days, but will then lose interest. Rawhide can also be difficult for some dogs to chew, due to teeth problems. Also, some owners will not permit their dogs to chew rawhide because there is a risk of choking on it.

The third type of toy is a "treat dispenser," in which the owner or the manufacturer can place a treat that the dog must locate and remove by chewing. The treats can be either dry (such as pieces of dry dog food) or moist (such a peanut butter or special recipes). These dispensers are typically simple rubber containers with an opening in them. A dog will spend more time with this type of toy because he has the challenge of forcing the treat out of the dispenser; if dry food is being dispensed, this may require 5 or 10 minutes. If a moist treat is used, it usually will stick to the dispenser and it may take the dog 15 to 20 minutes to force the treat out and lick it off. Once a dog has figured out how to remove the treat, he will remove it more quickly and the toy will become less interesting and less stimulating.

Some of these rubber treat dispensers have only surface openings of the type that when treats are placed in them, the treats protrude beyond the toy's surface, allowing an animal to simply pull them out. This provides a lesser challenge to the animal.

There are also treat-dispensing toys made of a hard plastic material. These can be a simple container with surface openings or more complex structures, an outer container possessing an inner container that tumbles as the dog plays with it. Depending on how the dog tumbles it, treats fall out when the openings of the inner and outer containers line up. These toys can be unpleasant to use because of the noise they make (hard plastic dropping against wood or tile floors, etc), they can cause damage to these same surfaces, and their hardness can cause injury to a dog's mouth. Also, with the double containers, the treats are set far within the toy, creating a hard-to-win situation for the animal. None of these are constructed from modules that can be attached and detached.

SUMMARY OF THE INVENTION

The toy of this invention is a module in which treats may be inserted, that has ends that enable the module to be removably attached to other modules. The modules are hollow and may have a variety of shapes. To keep the pet from being bored, the owner can easily take apart the modules and re-assemble them in a different order. In that way, the assembled toy has familiar openings and scents in unfamiliar locations, intriguing the animal and, because of the variety, keeping his interest much longer than previous toys.

DESCRIPTION OF THE PREFERRED EMBODIMENTS

Figure 1:
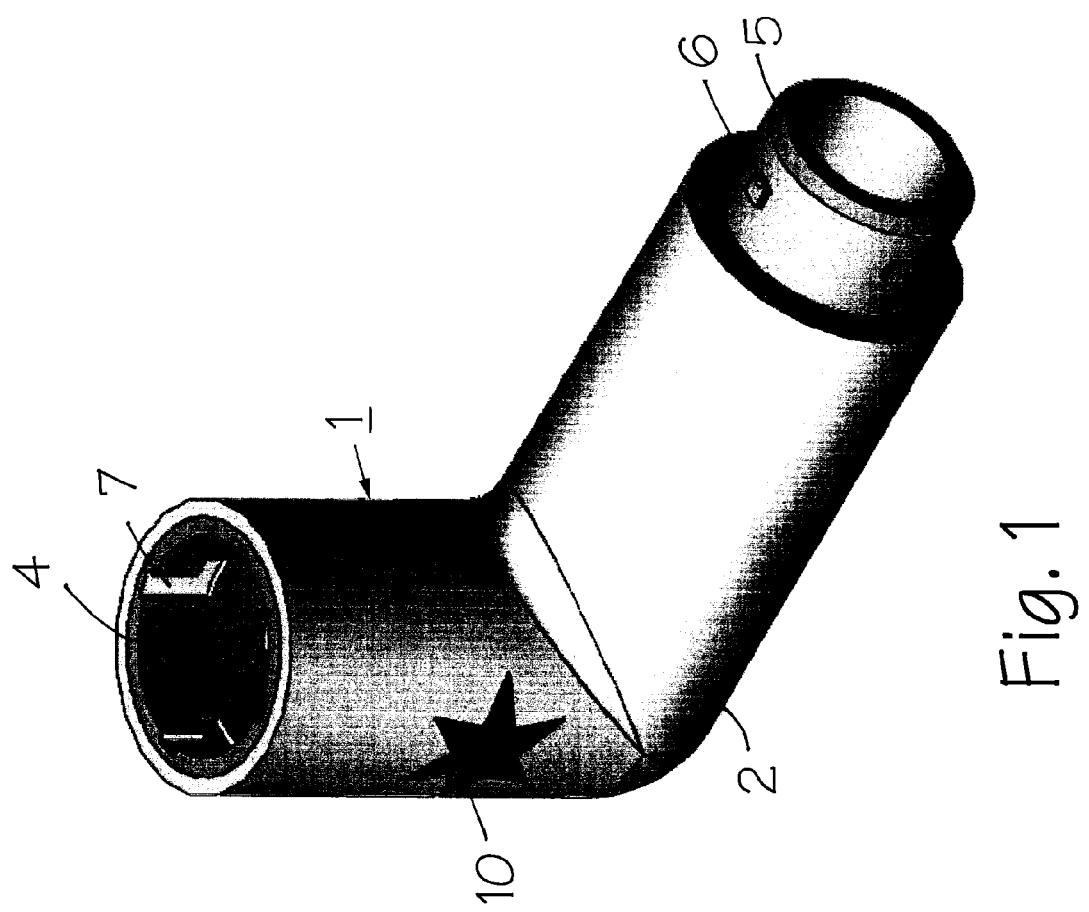
FIG. 1 is an isometric view of a certain presently preferred embodiment of an L-shaped module for a treat-dispensing toy according to this invention.
Figure 2:
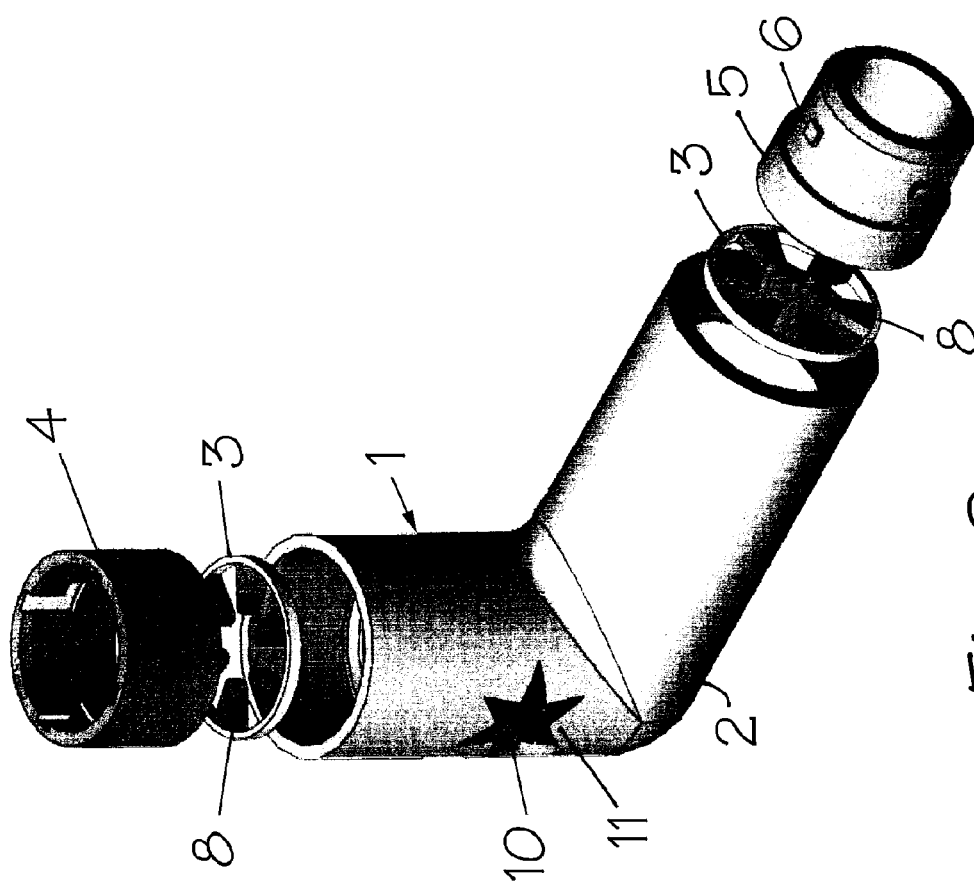
FIG. 2 is an isometric exploded view of the module of FIG. 1.
Figure 3:
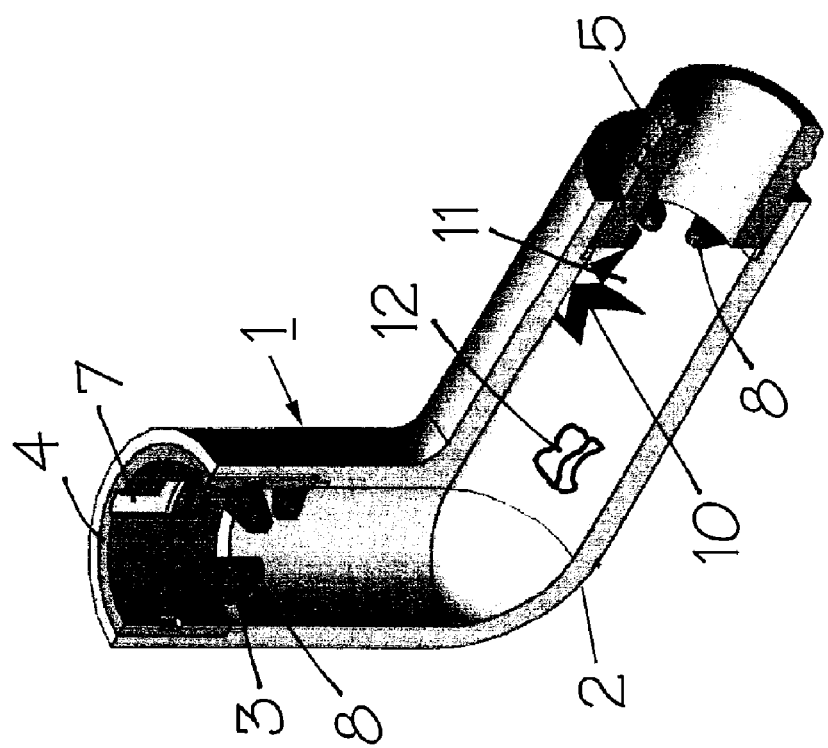
FIG. 3 is a sectional isometric view of the module of FIG. 1, showing treats inside.

In FIGS. 1, 2, and 3, module 1 is assembled from an L-shaped hollow treat holder 2, two treat barriers 3, a female end piece 4 and a male end piece 5. Each module 1 has at least one end that enables it to be attached to another module. Preferably, each module has two ends so that it can be attached in between other modules, but modules having only one end or more than two ends are also contemplated. These ends need not be unique (e.g., male and female), but can be designed so that any end can be attached to any other end. This may be accomplished, for example, by having clips and indentations on each end piece that lock onto indentations and clips on an end piece of another module. Preferably, however, each module has a female end and a male end, where the male end may be inserted into the female end, where female ends and male ends are made so that they lock together to prevent the modules from coming apart.

Referring to FIGS. 1 to 3, this locking mechanism preferably consists of tabs 6 extending from the male ends that insert into L-shaped grooves 7 in the female ends, so that when tabs 6 of a male end are inserted into grooves 7 of a female end and the two ends are rotated slightly, the ends cannot be pulled apart. The modules may also be locked together by other means, such as a circumferential rim on the male end that snaps into a circumferential groove on the female end. The locking mechanism may be made to "unlock," when vigorously chewed by an animal, so that a chewing animal can separate modules that have been locked together. This sets up a different sort of situation in that the animal feels some success in pulling apart the toys, as he might tear apart his food, and the toy becomes two different toys, keeping his interest longer. Partially locking the modules together may be accomplished, for example, using the locking mechanism shown in FIGS. 1 and 3, by inserting the male end into the female end, but not rotating the ends. (Even if the ends are rotated, vigorous chewing may disengage them.)

The ends are preferably circular as circular ends are easier to make and use; circular ends may be about 1 to about 5 inches in outside diameter with a thickness of about 0.1 to about 0.5 inches, though other dimensions may also be used. The ends may also have other cross-sectional shapes, such as oval, square, rectangular, triangular, etc. Whatever their cross-sectional shape, ends 4 and 5, are identical on all the modules in order to enable the modules to be attached to other modules. The modules may be made in different sizes to accommodate the size of the chewing animal. Small modules may be appropriate for rodents or miniature dog breeds, while much larger modules are used for large breeds of dogs.

As can be seen easily in FIG. 2, a treat barrier 3 is inserted between treat holder 2 and end pieces 4 and 5. Treat barriers 3 only partly bar the opening to treat holder 2, so that a person may insert a treat into treat holder 2 by pushing it past a treat barrier 3. However, a chewing animal can extract a treat through a treat barrier only with some difficulty. Treat barriers 3 are provided with a number of inwardly-extending prongs 8, which are elastomeric so that they may be pushed aside to insert a treat and will then return to their original position. Elastomeric prongs also prevent injury to the tongue of the animal. Barriers may be used inside the module to increase the difficulty of removing treats. Other types of treat barriers may also be used, such as a small disc held on an elastomeric hinge, slots of various shapes, flaps, or other protrusions from the inside wall into the interior space of each module. The treat barriers are preferably recessed in order to prevent a chewing animal from having direct access to them. Ends that do not open to the inside of treat holder 2, so that treats cannot be inserted or removed through the ends of the treat holder, are also contemplated.

End pieces 4 and 5 are preferably permanently fixed to treat holder 2. This may be accomplished by, for example, heat bonding, adhesive, or other non-toxic means. Alternatively, module 1 may be molded with end pieces 4 and 5 molded as part of treat holder 2; treat barriers 3 could then be inserted into each end. Other methods of making the modules may also be used.

Figure 4:
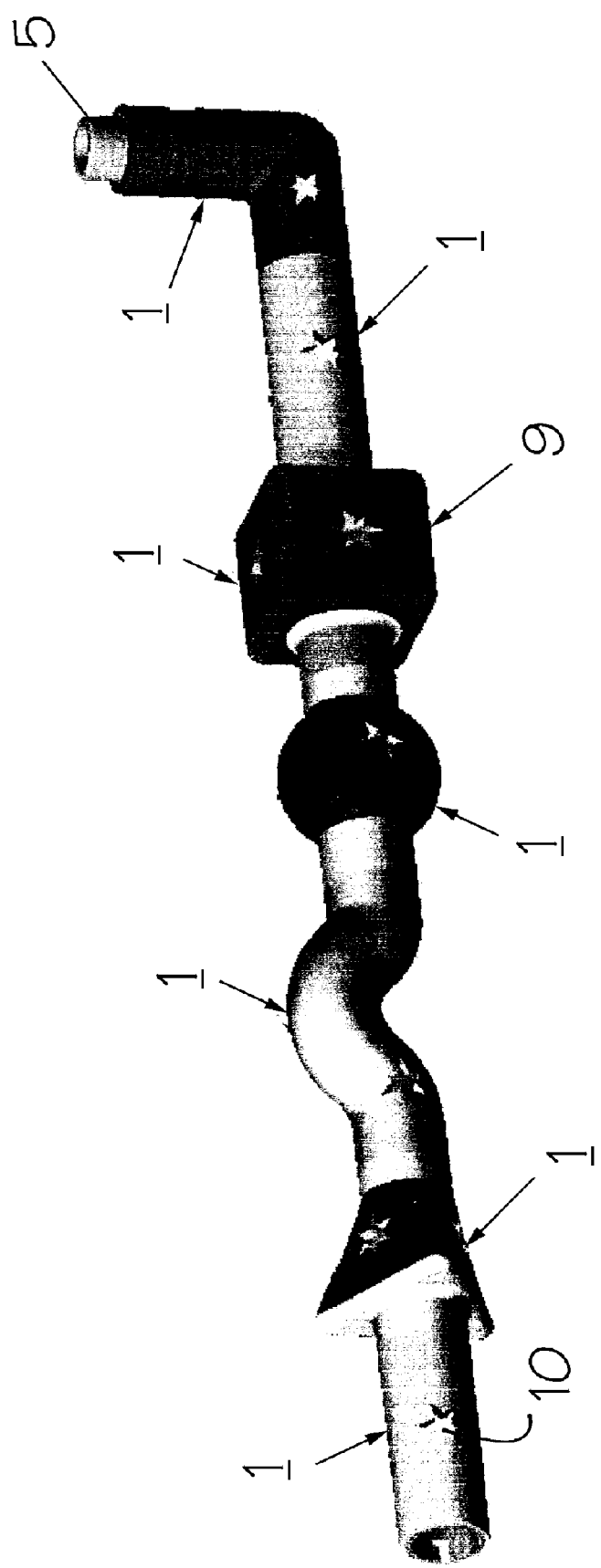
FIG. 4 is an isometric view of a treat-dispensing toy according to this invention, assembled from a multiplicity of modules.

While the ends of treat holder 2 are removably attachable to the ends of other modules and therefore have a shape that permits this, the remainder of the treat holder in between its ends may have any shape. FIG. 4 illustrates six modules 1 having a variety of shapes assembled into treat-dispensing toy 9. (A single module may also be used as a treat-dispensing toy.) The shapes illustrated in FIG. 4 are (from the left) straight, triangular, U-shaped, spheroidal, cubic, straight, and L-shaped. Other possible shapes include, for example, S-shaped, V-shaped, and toroidal. Preferably, all the modules used to assemble a toy differ in shape, so that no two modules have the same shape, thereby enabling a person to assemble the modules to form toys of greater variety. However, toys may also be constructed from identical modules. A preferred treat-dispensing toy has one straight module, one L-shaped module, one triangular module, one U-shaped module, one spheroidal module, and one cubic module.

Each treat holder 2 is provided with at least one aperture 10 through which treats may be inserted by a person or removed by a chewing animal. Preferably, each treat holder 2 has two apertures 10. These apertures permit a person to insert a treat relatively easily, but permit a chewing animal to remove a treat only with difficulty. To that end, they have a shape, such as a star shape, where prongs 11 extend into the aperture. Other shapes can also be used, such as as a cross, a wide slot, a triangular slot or a circular slot or opening.

Modules 1 are made of a tough non-toxic material that can be chewed by an animal, such as a dog, without easily disintegrating. That is, it should be tear and puncture-resistant. Rubbery materials are preferred; examples include styrene-butadiene-styrene, styrene-butadiene copolymer, polychloroprene (neoprene), nitrile rubber, butyl rubber, polysulfide rubber ("Thiokol"), cis-i,4-polyisoprene, ethylene-propylene terpolymers (EPDM rubber), silicone rubber, polyurethane rubber, and vulcanized natural rubber. Other materials that are elastomeric and puncture-resistant may also be used. The modules may have a variety of colors or may even glow-in-the-dark so that it may be located easily. They may also be clear so that the animal can see the treats.

The treats 12 (FIG. 3) that are used are preferably solid treats, such as dog biscuits, but pasty treats, such as dog food, may also be used. While a pet owner may insert treats into the treat-dispensing toy, the toy may also be sold with treats already contained within the modules.

What is claimed is:

1. A module for dispensing a treat to a chewing animal comprising
    (A) a rubbery hollow treat holder having at least one partly barred aperture through which a treat can be inserted by a person or removed by a chewing animal;
    (B) at least one open end that can be removably attached to an open end of another of said modules; and
    (C) a treat barrier having inwardly-directed prongs that partly bar said open end, whereby a treat can be inserted into said hollow treat holder by a person or can be removed from said hollow treat holder by a chewing animal through said aperture or through said open end.

2. A module according to claim 1 wherein said aperture is star shaped.

3. A module according to claim 1 wherein said treat holder has at least two of said apertures.

4. A module according to claim 1 wherein said open end is circular in cross-section.

5. A module according to claim 1 wherein said treat holder has two open ends.

6. A module according to claim 5 wherein one of said two ends is a male end and the other of said two ends is a female end and said male end locks into said female end.

7. A module according to claim 1 wherein said inwardly-directed prongs are elastomeric.

8. A module according to claim 7 including a recessed treat barrier at each end.

9. A module according to claim 1 wherein said hollow treat holder has a shape selected from the group consisting of straight, triangular, U-shaped, spheroidal, cubic, and L-shaped.

10. A module according to claim 1 including a dog biscuit inside said hollow treat holder.

11. A module according to claim 1 wherein said at least one end is circular and about 1 to about 5 inches in diameter.

12. A treat-dispensing toy for pets comprising a multiplicity of modules according to claim 1 removably attached to each other.

13. A method of entertaining and feeding a chewing animal comprising inserting a treat into a module according to claim 1 and permitting said chewing animal to chew on said module.

14. A module for dispensing a treat to a chewing animal comprising
   (A) a rubbery hollow treat holder having at least one star-shaped aperture through which a treat may be inserted by a person or removed by a chewing animal; and
   (B) two end pieces fixed to said hollow treat holder;
   (C) a treat barrier having elastomeric inwardly-directed prongs that partly bars said open end, where said end pieces can be removably attached to an end piece of another of said modules and through which a treat can be inserted into said hollow treat holder by a person and can be removed from said hollow treat holder by a chewing animal.

15. A module according to claim 14 wherein one of said two ends is a male end and the other of said two ends is a female end and said male end locks into said female end.

16. A module according to claim 14 including a recessed treat barrier at each end.

17. A module according to claim 14 wherein a barrier is in between said end pieces and said hollow treat holder.

18. A treat-dispensing toy for pets comprising a multiplicity of modules according to claim 14 removeably attached to each other.

19. A module for dispensing a treat to a chewing animal comprising
   (A) a rubbery hollow treat holder having two star-shaped apertures through which a treat may be inserted by a person or removed by a chewing animal; and
   (B) a male end piece and a female end piece fixed to said hollow treat holder, where said male end piece can be removably attached to the female end piece of another of said modules; and
   (C) a treat barrier having inwardly-directed prongs in between each end piece and said hollow treat holder, whereby a treat can be inserted into said hollow treat holder by a person or can be removed from said hollow treat holder by a chewing animal through said aperture or through either of said end pieces.

20. A treat-dispensing toy for pets comprising a multiplicity of modules according to claim 19 removably attached to each other.

* * * * *